United States Patent
Enebakk et al.

(10) Patent No.: US 7,854,784 B2
(45) Date of Patent: Dec. 21, 2010

(54) CALCIUM-SILICATE BASED SLAG FOR TREATMENT OF MOLTEN SILICON

(75) Inventors: Erik Enebakk, Kristiansand (NO); Gabriella Maria Tranell, Trondheim (NO); Ragnar Tronstad, Kristiansand (NO)

(73) Assignee: Elkem ASA, Oslo (NO)

( * ) Notice: Subject to any disclaimer, the term of this patent is extended or adjusted under 35 U.S.C. 154(b) by 0 days.

(21) Appl. No.: 12/501,725

(22) Filed: Jul. 13, 2009

(65) Prior Publication Data

US 2009/0274608 A1    Nov. 5, 2009

Related U.S. Application Data

(62) Division of application No. 10/515,583, filed as application No. PCT/NO03/00091 on Mar. 17, 2003.

(30) Foreign Application Priority Data

May 22, 2002   (NO)  ................................. 20022409

(51) Int. Cl.
  *C22B 61/00* (2006.01)
(52) U.S. Cl. .......................................... 75/303; 75/392
(58) Field of Classification Search ................ 75/10.35, 75/10.46, 10.5, 10.51, 303, 309, 326, 328, 75/329, 392, 406, 414, 560, 570, 582, 585, 75/708, 709; 420/117, 129; 423/348–350
  See application file for complete search history.

(56) References Cited

U.S. PATENT DOCUMENTS

| | | | |
|---|---|---|---|
| 3,711,278 A | 1/1973 | Josefsson | |
| 3,871,872 A | 3/1975 | Downing et al. | |
| 4,151,264 A | 4/1979 | More et al. | |
| 4,312,700 A | 1/1982 | Helmreich et al. | |
| 4,340,426 A | 7/1982 | Tabei et al. | |
| 4,457,903 A | 7/1984 | Dietl et al. | |
| 4,515,600 A | 5/1985 | Dietl et al. | |
| 4,534,791 A * | 8/1985 | More et al. ................. | 75/10.47 |
| 4,837,376 A * | 6/1989 | Schwirtlich et al. ......... | 423/348 |
| 5,187,126 A | 2/1993 | Sonobe et al. | |
| 5,788,945 A | 8/1998 | Schei | |
| 6,368,403 B1 | 4/2002 | Schmid et al. | |

FOREIGN PATENT DOCUMENTS

| | | |
|---|---|---|
| EP | 0002135 | 5/1979 |
| GB | 2116956 A | 10/1983 |
| JP | 07206420 A | 8/1995 |
| NO | 980139 | 1/1998 |
| WO | 9703922 | 2/1997 |

\* cited by examiner

*Primary Examiner*—George Wyszomierski
*Assistant Examiner*—Mark L Shevin
(74) *Attorney, Agent, or Firm*—Lucas & Mercanti, LLP

(57) ABSTRACT

A method for making solar grade silicon from metallurgical grade silicon is accomplished by treating a calcium silicate based slag with ferrosilicon in the first vessel so as to obtain a purification of the calcium silicate based slag. In a second vessel, the purified calcium based silicate slag is used to treat metallurgical grade silicon in order to obtain a solar grade silicon. The purification of calcium silicate based slag in the first vessel is accomplished to reduce phosphorous to a level of less than 3 ppmw.

9 Claims, No Drawings

CALCIUM-SILICATE BASED SLAG FOR TREATMENT OF MOLTEN SILICON

RELATED APPLICATION

This application is a divisional application of the U.S. application Ser. No. 10/515,583, which is a 371 of PCT/NO03/00091 filed Mar. 17, 2003, which claimed the priority of Norwegian Patent Application No. 20022409 filed May 22, 2002. The contents of all three applications are incorporated herein by references and priority of all these application is claimed.

FIELD OF INVENTION

The present invention relates to a calcium-silicate based slag having a very low phosphorous content, a method for producing such calcium-silicate based slag having a very low phosphorous content, and to the use of the calciumsilicate based slag for the removal of boron and phosphorous from molten silicon.

BACKGROUND ART

In the method of refining metallurgical grade silicon in order to produce pure silicon for solar cell production (solar grade silicon) it is known to remove boron by treatment of molten silicon with a calcium-silicate based slag. Such a method is disclosed in U.S. Pat. No. 5,788,945. In order to remove boron from silicon to an acceptable low level it is necessary to use a slag having a low boron content.

For solar grade silicon there is also strict requirements to the content of phosphorous. Thus the phosphorous content of solar grade silicon should be less than 3 ppmw.

The slag treatment of silicon in order to remove boron also influences the phosphorous content of silicon. Thus the distribution coefficient between phosphorous in slag and phosphorous in silicon is very low and in the range between 0.1 and 0.3. If calcium-silicate based slag used to remove boron from silicon contains too much phosphorous, the phosphorous content of silicon can therefore be increased during the slag treatment. It is thus important to use a low phosphorous containing calcium-silicate based slag for removal of boron from silicon.

When preparing phosphorous containing calcium-silicate based slag from CaO and $SiO_2$ it is difficult to find a CaO source having a sufficiently low phosphorous content. In order not to increase the phosphorous content of silicon during slag treatment the calcium-silicate based slag, the phosphorous content of the calcium-silicate based slag should be as low as possible and preferably well below 3 ppmw.

DISCLOSURE OF INVENTION

It is an object of the present invention to provide a calcium-silicate based slag having a very low phosphorous content and a method for removing phosphorous from calcium-silicate based slag where low cost sources of CaO and $SiO_2$ can be used to produce the slag.

Thus, according to a first aspect the present invention relates to a calciumsilicate based slag for treatment of molten silicon, said slag having a phosphorous content of less than 3 ppmw.

According to a preferred embodiment the calcium-silicate based slag has a phosphorous content below 1 ppmw.

According to a preferred embodiment the calcium-silicate based slag contains $CaF_2$ and/or MgO in an amount of up to 30% by weight in order to lower the viscosity of the slag and to increase removal of phosphorous and boron from silicon.

According to another preferred embodiment the calcium-silicate based slag contains one or more of $BaF_2$, BaO, LiF and $Li_2O$ in an amount of up to 10% by weight in order to adjust the density of the slag to facilitate removal of the slag from silicon after slag treatment.

According to yet another preferred embodiment the calcium-silicate based slag contains $Al_2O_3$ in order to be able to adjust the aluminum content of silicon to be treated with the slag.

According to a second aspect the present invention relates to a method for producing a low phosphorous calcium-silicate based slag, which method is characterized in that molten calcium-silicate based slag is treated with a molten ferrosilicon alloy in a vessel whereby phosphorous in the calcium-silicate based slag is transferred to the ferrosilicon alloy, and separating the molten low phosphorous calcium-silicate based slag from the molten ferrosilicon alloy.

According to a preferred embodiment a molten layer of a ferrosilicon alloy is provided in the vessel, whereafter a $SiO_2$ source, a CaO source are supplied to the top of the layer of ferrosilicon alloy to provide a layer of molten calciumsilicate based slag whereby phosphorous in the calcium-silicate based slag is transferred to the ferrosilicon alloy, and removing the low phosphorous calcium-silicate based slag from the vessel.

Preferably the ferrosilicon alloy comprises up to 30% by weight silicon, the remaining being iron except for normal amounts of impurities. More preferably the ferrosilicon alloy comprises 10-20% by weight silicon. The amount of silicon in the ferrosilicon alloy should balance the amount of $SiO_2$ in the liquid calcium-silicate based slag in order to prevent silicon in the slag from entering the ferrosilicon alloy and thus changing the composition of the slag.

According to another embodiment, the molten ferrosilicon alloy can be produced in situ by adding Fe2O3 and Si together with the slag forming compounds $SiO_2$ and CaO. Upon heating Fe2O3 will be reduced to Fe by some of the Si added and form the ferrosilicon alloy. In this embodiment the amount of $SiO_2$ supplied may have to be adjusted in order to compensate for the amount of $SiO_2$ produced when Fe2O3 is reduced by Si, in order to obtain a suitable final composition of the calcium-silicate based slag.

In order to increase the speed of reaction between the molten calcium-silicate based slag and the molten ferrosilicon alloy a reducing and/or an inert gas or a mixture of such gases are supplied to the vessel in order to stir the layers of molten ferrosilicon and liquid calcium-silicate based slag. Typically, carbon monoxide and hydrogen are supplied as reducing gases and argon and nitrogen are supplied as inert gases.

By the method of the present invention it has surprisingly been found that practically 100% of the phosphorous in the calcium-silicate based slag is transferred to the ferrosilicon alloy. Further, only a small amount of iron is being transferred from the ferrosilicon alloy to the calcium-silicate based slag.

By the method of the present invention it is thus possible to produce a calcium-silicate based slag having a phosphorous content of below 1 ppmw from a calcium-silicate slag which initially at least 30 ppmw phosphorous.

Cheap sources of lime and quarts can thus be used to provide a high quality calcium-silicate based slag which is excellent for the removal of boron and phosphorous from molten silicon.

In one embodiment the calcium-silicate based slag treated for removal of phosphorous is slag which has been used for slag treatment of molten silicon and thus has an increased content of phosphorous. In this way calciumsilicate based slag from treatment of molten silicon can be regenerated and recycled thus strongly reducing the costs for slag treatment of molten silicon and avoiding disposal of large volumes of used calcium-silicate based slag.

The method of the present invention can be carried out in conventional high temperature furnaces such as induction furnaces and arc furnaces.

In a preferred embodiment it is used an arc furnace having vertical electrodes and equipped with a lower tapping hole near its bottom and an upper tapping hole at a higher level. The process is started by establishing a layer of molten ferrosilicon alloy at the bottom of the furnace, where the top of the layer of ferrosilicon is well below the upper tapping hole. Thereafter slag forming compounds or used slag for regeneration is added until a layer of molten slag extending a distance above the upper tapping hole is formed. When the supply of slag forming compounds is finished, the molten layer of slag is allowed to stay in the furnace for a predetermined period to ensure removal of phosphorous from the slag and into the ferrosilicon alloy. The upper tapping hole is then opened and the slag above the tapping hole is being tapped from the furnace. After tapping, the upper tapping hole is closed and further slag forming compounds are supplied to the furnace. When the phosphorous content in the ferrosilicon alloy has increased to a preset value, the ferrosilicon alloy is tapped from the lower tapping hole and the above described process is repeated. In this way it is obtained a semi-continuous, low cost production of low phosphorous calcium-silicate based slag.

The present invention also relates to the use of the slag produced according to the method of the present invention for removal of boron and phosphorous from molten silicon.

DETAILED DESCRIPTION OF INVENTION

EXAMPLE 1

A layer of molten ferrosilicon alloy consisting of 85% by weight Fe and 15% by weight Si was provided at the bottom of an induction furnace. 120 grams of 10 quarts having a phosphorous content of 4 ppmw and 130 grams of lime having a phosphorous content of 35 ppm were added to the induction furnace and melted on the top of the molten ferrosilicon layer. The initial phosphorous content of the liquid slag was calculated to 20 ppmw based on the phosphorous content of quarts and lime.

Three tests were run using different gas compositions for stirring the melt. The stirring gas was supplied through a graphite tube. After treatment the slag was tapped from the induction furnace and analysed with respect to phosphorous, boron, CaO, $SiO_2$ and $Fe2O3$. The results are shown in Table 1.

TABLE 1

| | | Chemical Analysis | | | | |
| --- | --- | --- | --- | --- | --- | --- |
| Test No. | Stirring gas | P* [ppmw] | B [ppmw] | CaO [wt %] | $SiO_2$ [wt %] | $Fe_2O_3$ [wt %] |
| A | Ar—5%$H_2$ | <2.5 | 8.1 | 53.44 | 46.48 | 0.12 |
| B | Ar—25%CO | <2.5 | 8.4 | 53.36 | 46.55 | <0.12 |
| C | Ar | <2.5 | 8.1 | 53.01 | 47.60 | 0.12 |

*detection limit for P in slag: 2.5 ppmw (ICP)

The results in Table 1 show that the phosphorous content in the produced slags was below the detection limit of 2.5 ppm for all three slags. Based on calculations of mass balances from use of the produced slags in slag treatment of molten silicon, it was found that the phosphorous content of the three slags produced in fact was about 0.1 ppmw. Further, Table 1 shows that the content of Fe2O3 in the three slags was very low, indicating that only a minor amount of iron was transferred from the ferrosilicon alloy to the slag phase.

EXAMPLE 2

The three slags A, B and C produced in Example 1 were used to remove boron and phosphorous from molten silicon. Molten metallurgical grade silicon containing 47 ppmw boron, 9 ppmw phosphorous and 0.25% by weight of iron was treated with the slags A, B and C produced in Example 1. The weight ratio of slag to silicon was 2.6 for all runs. The content of phosphorous, boron and iron in the used slags and in the treated silicon were analysed. The results are shown in Table 2.

TABLE 2

| | Pppmw | | Bppmw | | Fe % by weight |
| --- | --- | --- | --- | --- | --- |
| Slag | in slag | in Si | in slag | in Si | In Si |
| A | 2.5* | 3 | 25.5 | 8.6 | 0.4 |
| B | 2.5* | 4 | 25.1 | 8.5 | 0.4 |
| C | 2.5* | 4 | 25.7 | 8.5 | 0.4 |

*detection limit for P in slag: 2.5 ppmw (ICP)

From the results in Table 2 it can be seen that a very good boron removal was obtained for all three slags and that the phosphorous content in the treated silicon was reduced from 9 to about 4 ppmw.

The invention claimed is:

1. A method for making solar grade silicon from metallurgical grade silicon comprising,
   treating a calcium-silicate based slag with a molten ferrosilicon alloy in a first vessel, whereby phosphorous in the calcium-silicate based slag is transferred to the ferrosilicon alloy producing a calcium-silicate based slag containing less than 3 ppmw phosphorous;
   obtaining the calcium-silicate based slag containing less than 3 ppmw phosphorous from the first vessel;
   treating a molten metallurgical grade silicon in a second vessel with the calcium-silicate based slag containing less than 3 ppmw phosphorous to reduce the content of phosphorous, boron and iron in the metallurgical grade silicon and produce a solar grade silicon; and
   removing the solar grade silicon from the second vessel.

2. The method according to claim 1, wherein the step of treating a calcium-silicate based slag with the molten ferrosilicon alloy in a first vessel further comprising
   providing a molten layer of the ferrosilicon alloy in the first vessel;
   supplying a $SiO_2$ source and a CaO source to the top of the layer of ferrosilicon alloy to generate a layer of molten calcium-silicate based slag, whereby phosphorous in the calcium-silicate based slag is transferred to the ferrosilicon alloy producing a calcium-silicate based slag containing less than 3 ppmw phosphorous.

3. The method according to claim 1, wherein the molten ferrosilicon alloy is produced in situ in the first vessel by adding $Fe_2O_3$ and Si together with the calcium-silicate based slag.

4. The method according to claim 1, wherein the ferrosilicon alloy contains up to 30% by weight of silicon, the remainder, except for normal impurities, being iron.

5. The method according to claim 4, wherein the ferrosilicon alloy contains 10 to 20% by weight of silicon.

6. The method according to claim 1, wherein the calcium-silicate based slag supplied to the first vessel is a calcium-silicate based slag which has been used for treating molten metallurgical grade silicon in the second vessel.

7. The method according to claim 1, further comprising a step of supplying a reducing and/or an inert gas or a mixture of said gases to the first vessel in order to stir the molten ferrosilicon alloy and the calcium-silicate based slag.

8. The method according to claim 7, wherein the reducing gases comprise carbon monoxide and hydrogen.

9. The method according to claim 8, wherein the inert gases comprise argon and nitrogen.

* * * * *